(12) United States Patent
Chamberlain et al.

(10) Patent No.: US 6,659,536 B1
(45) Date of Patent: Dec. 9, 2003

(54) INTEGRATED VEHICLE DOOR PROTECTOR MODULE

(75) Inventors: William S. Chamberlain, Rochester, MI (US); David Otto, Lake Orion, MI (US)

(73) Assignee: JS Chamberlain & Associates, Inc., Troy, MI (US)

( * ) Notice: Subject to any disclaimer, the term of this patent is extended or adjusted under 35 U.S.C. 154(b) by 0 days.

(21) Appl. No.: 10/354,871

(22) Filed: Jan. 30, 2003

Related U.S. Application Data

(60) Provisional application No. 60/353,341, filed on Feb. 1, 2002.

(51) Int. Cl.[7] .................................................. B60J 5/04
(52) U.S. Cl. ............................... 296/146.5; 296/146.7; 296/39.1
(58) Field of Search ........................... 296/146.7, 39.1, 296/39.3, 146.5; 49/502

(56) References Cited

U.S. PATENT DOCUMENTS

| 4,588,627 A | | 5/1986 | Isaksen et al. |
| 4,873,132 A | | 10/1989 | Jones et al. |
| 5,050,351 A | * | 9/1991 | Goldbach et al. ............. 49/502 |
| 5,345,720 A | | 9/1994 | Illbruck et al. |
| 6,086,139 A | * | 7/2000 | Heim et al. ............... 296/146.5 |
| 6,123,385 A | * | 9/2000 | Bailey et al. ............. 296/146.7 |

* cited by examiner

Primary Examiner—Joseph D. Pape
(74) Attorney, Agent, or Firm—Young & Basile, PC

(57) ABSTRACT

A door protector module includes a unitarily constructed inner belt weatherstrip, a shield and a lower door seal which are attachable as a one piece assembly to a vehicle door inner trim panel or the inner door panel. The inner belt weatherstrip, the shield and the lower door shield are formed with complimentary adjoining shapes for affixing the inner belt weatherstrip, the shield and the lower door shield into a unitary structure by snaps, fasteners, adhesive, etc.

20 Claims, 2 Drawing Sheets

INTEGRATED VEHICLE DOOR PROTECTOR MODULE

CROSS REFERENCE TO CO-PENDING APPLICATION

This application claims the benefit of the Feb. 1, 2002 priority filing date of of Provisional Patent Application, Serial No. 60/353,341, the contents of which are incorporated herein in its entirety.

BACKGROUND

A typical vehicle door is formed of inner and outer sheet metal panels which are joined together to form an interior cavity which may carry a side impact reinforcement. The upper edges of the inner and outer door panels define a slot through which a window glass moves between raised and lowered positions.

The window elevation control mechanism, door locks, outside mirror controls, etc., are carried in the door between the inner and outer panels.

A deflector, which may have acoustic noise reduction properties, is formed as a sheet and attached, typically by adhesive, along its outer periphery to the inner door sheet metal panel to seal the interior of the vehicle from the external environment as well as providing acoustic reduction properties from exterior noise.

An inner door trim panel, typically formed of a plastic-based material, is mounted on the inner door sheet metal, usually by means of clips. The door trim panel carries the door or hardware control actuators, such as the door lock handle, the external mirror control switches, and the door elevating control handle or push buttons in the case of a motor driven door window elevating mechanism. The actuators extend through corresponding apertures in the deflector and connect to the appropriate mechanisms mounted in the door.

The inner trim panel sometimes carries an inner belt weather strip which is attached to an upper edge of the trim panel and has an inner surface, typically "flocked" or low coefficient of friction coating, which engages the window during raising and lowering movements. The inner belt weather strip typically includes a channel to divert water, dirt and/or condensation build-up on the inner surface of the window away from the vehicle interior. The inner belt weather strip is attached to the door trim panel by any of a number of different fastening mechanisms including integrated fasteners, push pins, staples, etc.

A lower door seal may also be provided at a lower edge of the door trim panel to seal the lower edge of the door to the vehicle sill plate and to act as a secondary seal for noise, dirt, water, etc., intrusion into the vehicle passenger compartment. The lower door seal is attached to the inner door panel by various joining techniques, such as push pins, adhesive tape, etc.

A trend in current vehicle door design is increased levels of modularity in which more and more components are assembled into a complete module for faster and easier assembly to the vehicle in the vehicle production plant. One trend option is leading to the mounting of all of the door window, door lock and external mirror control hardware and actuators onto the inner door trim panel. Cables or other connectors extend from the appropriate hardware and actuators on the trim panel to the window, door lock mechanism and mirror controls mounted in the door sheet metal panels. However, these connectors or cables must still pass through the deflector to the cavity in the inner/outer door sheet metal.

Thus, it would be desirable to provide an integral vehicle door protector module having increased modularity to simplify the vehicle door assembly process.

SUMMARY

The present invention is a unitary door protector module which is mountable on the vehicle door in a single assembly operation.

In one aspect, the door protector module includes an inner belt weatherstrip, a shield and a lower door seal which are unitarily joined together as a one piece module adapted for unitary attachment to the inner door trim panel and/or the inner door panel of the vehicle door.

In another aspect of the invention, a method for manufacturing a unitary door protector module comprises the step of:

providing an inner belt weatherstrip, a shield and a lower door seal; and joining the inner belt weatherstrip, the shield and the lower door seal into a unitary, one piece module for attachment to one of the inner door trim panel and the inner door panel of the vehicle door.

The unitary door protector module of present invention uniquely combines multiple components which were previously individually mounted to a vehicle door in the door assembly operation into a single, unitary module which can be mounted on the vehicle door in a single assembly operation. This reduces manufacturing costs by reducing the number of separate components which must be separately installed on the vehicle door, minimizes worker assembly time, reduces assembly line length, and increases reliability of the door since the individual door protector components can be pre-assembled and tested for quality before assembly on the vehicle door.

BRIEF DESCRIPTION OF THE DRAWING

The various features, advantages and other uses of the present invention will become more apparent by referring to the following detailed description and drawing in which.

DETAILED DESCRIPTION

Figure 1:
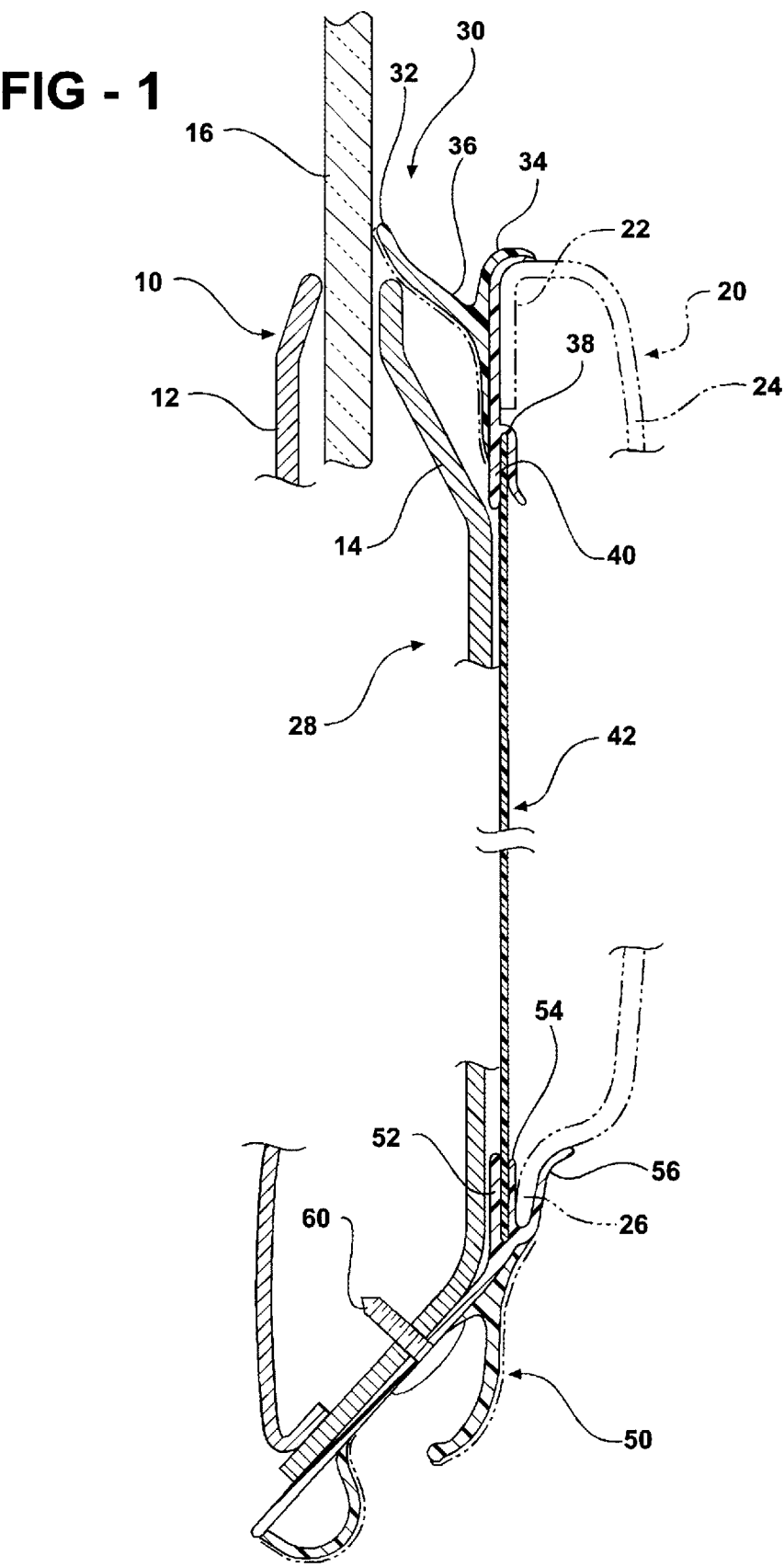
FIG. 1 is a side elevational, cross-sectional view of an integrated vehicle door protector module according to one aspect of the present invention.

Referring now to the drawing, FIG. 1 depicts one aspect of the present integrated vehicle door protector module which is configured for mounting on a door upper trim panel mountable on a conventional vehicle door or hatch 10 formed of an outer, typically panel 12 which is joined at its edges to an inner, panel 14. Both panels 12 and 14 are typically formed on sheet metal, but one or more of the panels 12 and 14 may also be formed of non-metallic materials, such as plastic, fiberglass, etc. The central portions of the inner and outer door panels 12 and 14 are spaced apart to define a hollow cavity or chamber in which the vehicle door window glass 16 is movably mounted for elevational movement between raised and lowered positions. Although not shown in FIG. 1, conventional window and door lock and/or mirror control elements or hardware are also mounted in the door cavity and connected to at least a lower portion of the window 16 and activation of the lock and mirror to control the elevating and lowering movements of the window 16 in response to an interior actuator, not shown, mounted on an upper door trim panel 20 and connected by cables, connectors, etc., to the control elements.

Also not shown in FIG. 1 are the additional door mounted hardware elements, such as the door lock mechanism, exterior mirror control cables, etc. These elements include cables or connectors extending to actuators mounted in the inner door trim panel 20.

As shown in FIG. 1, the inner door trim panel 20 can take a number of different shapes depending on the vehicle design. Thus, by example only, the inner door trim panel 20 is shown with a first end 22 shaped with a depending lip or flange, an elongated, sheet-like central portion 24 on which the various door control element actuators are mounted, and a lower, second end 26.

The inner door trim panel 20 can be formed of many different materials, depending upon the vehicle design. Such materials can be various plastics, such as HCPP, and fabric or natural material combinations.

According to the aspect of the door protector module 28 of the present invention shown in FIG. 1, an inner belt weather strip 30 may consist of a number of different materials, such as rubber and/or thermoplastic elastomer, olefinic based materials being one example.

The inner belt weather strip 30 may include an upper outer lip 32 which, in cooperation with an inner lip/edge or flange 34, forms a channel 36 along the upper edge of the inner belt weather strip 30 to catch any potential water or debris on the inside surface of the window 16. The inner lip 34 is configured to snap over and around the first end 22 of the inner door trim panel 20 to attach the inner belt weather strip 30 and the entire door protector module 28 to the first end 22 of the upper door trim panel 20.

In addition to a snap fit, the inner belt weather strip 30 may be more securely attached to the inner door trim panel 20 by means of mechanical fasteners, such as staples, clips, pins, adhesive, etc.

As shown in FIG. 1, the inside surface of the outer lip 32 and the lower flange 38 are formed with a smooth, low friction finish, such as with the addition of a "flock" material for smooth engagement with the window 16.

As also shown in FIG. 1, a lower flange 38 is formed with a mounting means in the form of a mounting surface 40. By example only, the mounting surface 40 is depicted in FIG. 1 as being in the form of a channel for a snap connection to the shield 42. Alternately, the mounting surface 40 can take other shapes, such as a flat surface, etc., for receiving fasteners, adhesive, etc.

The mounting surface 40 serves as an attachment surface for one edge of a water deflector or shield 42. Such deflectors or shields are well known as shown in U.S. Pat. Nos. 4,588,627, 4,873,132 and 5,345,720. The shield 42 may be formed of any suitable material, such as rain paper, polyethylene, EBA, foam, polyvinylchloride, etc. These materials may also be blended with various other additives to enhance the acoustic reduction characteristics of the shield 42.

The lower end of the shield 42 is configured for sealed attachment to a lower door seal 50. The lower door seal 50 is formed of a suitable seal material, such as TPE, with olefinic based materials being an example. The lower door seal 50 may take any shape suitable for a particular vehicle design. One such shape is shown by example in FIG. 1. Regardless of its shape, the lower door seal 50 serves as a barrier or seal between the lower edge of the door 10 and the opposed door sill, not shown.

As depicted in FIG. 1, the lower door seal 50 includes a first outer flange 52, an intermediate flange 54 and a further spaced inner flange 56. The flanges 52, 54 and 56 are spaced apart and define slots which receive the lower edge of the shield 42 and the lower or second end 26 of the upper door trim panel 20.

The flanges 52 and 54 form a channel which receives one end of the shield 42. The lower end of the shield 42 can be attached to the lower door seal 50 by suitable means, such as pins, adhesive, co-extrusion, as described hereafter, etc.

Similarly, the second end 26 of the upper door trim panel 20 is inserted into the channel formed between the intermediate flange 54 and the inner flange 56 and secured thereto by means of adhesive, mechanical fasteners, such as pins, etc.

The entire lower door seal 50 is attachable to the adjacent surfaces of the door panels 12 and/or 14 by various methods, such as push pins 60, adhesive coatings, adhesive tape, etc.

According to the present invention, the integrated door protector module 28 includes the inner belt weather strip 30, the shield 42 and the lower door seal 50 as a unitary structure. This unitary structure can be achieved by means of the various attachments described above, such as mechanical fasteners, adhesive, adhesive tape, etc. Alternately, the inner belt weather strip 30, the shield 42 and the lower door seal 50 may be co-extruded or joined together by heat or sonic bonding at the adjoining edges into a unitary structure with the weatherstrip 30, the shield 42 and the lower door seal 50 forming portions of the integrated, unitary module.

It is also feasible, within the scope of the present invention, to form the inner weather belt strip 30, the shield 42 and the lower door seal 50 as an integral, unitary, one piece structure as a single, multi-material extrusion through a suitably formed die.

Regardless of the construction or attachment mechanisms employed to form the unitary door protector module 28, the inner belt weather strip 30, the shield 42 and the lower door seal 50 are constructed as a unitary, one piece structure which can be attached as a single piece to the upper door trim panel 20 through attachment of the inner belt weather strip 30 to the first end 22 of the inner door trim panel 20 and attachment of the lower door seal 50 to the lower or second end 26 of the inner door trim panel 20.

The one piece integrated door protector module 28 of the present invention simplifies the construction of the upper door trim panel and the vehicle door 10 since a large number of the door contained elements, such as the door window elevation motor and actuator, the door lock power drive and actuator and the actuator and cables for exterior mirror adjustment, can be mounted directly on and sealed to the inner door trim panel 20 by the attachment of the one piece door protector module 28 formed of the inner belt weather strip 30, the shield 42 and the lower door seal 50. This protects the elements and electronics from dirt, dust, and water from shipping through assembly on the vehicle and during vehicle use. The entire inner door trim panel 20 may then be attached to the vehicle door 10 by means of the door mounting clips and the attachment mechanism chosen for the lower door seal 50 as described above.

Figure 2:
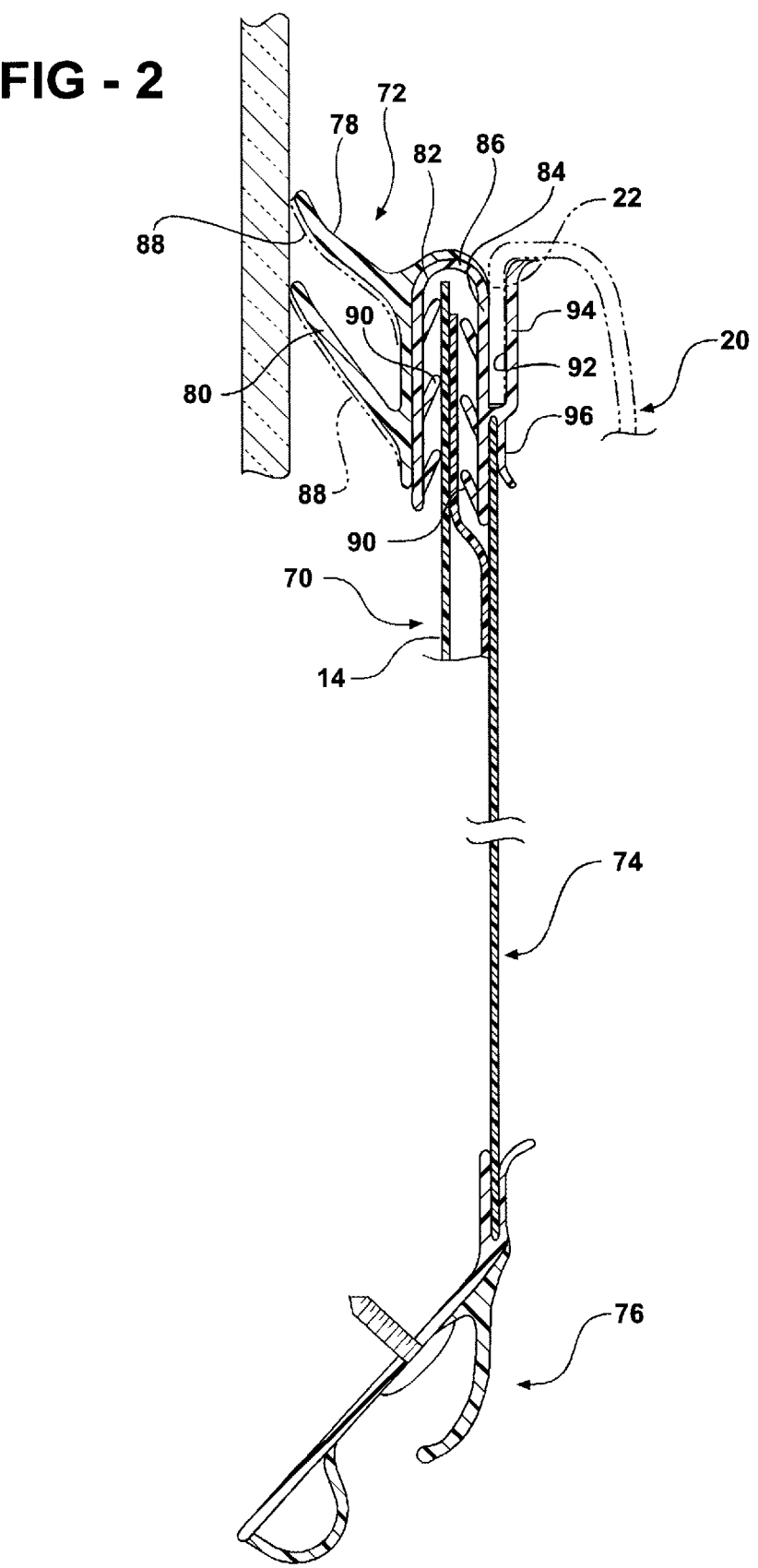
FIG. 2 is a side elevational, cross-sectional view of an integrated vehicle door protector module according to another aspect of the present invention.

FIG. 2 depicts another aspect of a door protector module 70 which is also formed as a one piece, unitary assembly of an inner belt weather strip 72, a shield 74 and a lower door seal 76. The shield 74 and the lower door seal 76 are substantially identical to the shield 42 and the lower door seal 50 described above and shown in FIG. 1.

In this aspect of the invention, the inner belt weather strip 72 serves the same function as inner belt weather strip 30 shown in FIG. 1 but has a different attachment mechanism. Thus, by example, the inner belt weather strip 72 includes an upper outer flange 78 and a lower outer flange 80 which extend outward from a channel portion formed of opposed side walls 82 and 84 joined by a central end wall 86. One surface of each of the flanges 78 and 80 is formed as a smooth, low friction surface, such as by a "flock" material 88, for smooth engagement with the sliding window, not shown.

The side walls 82 and 84 carry angular projections 90 which fixedly or securely engage the inner door panel 14 and mount the upper end of the door protector module 70 to the inner door panel 14. This enables the inner belt weather strip 72 to be snapped over the upper edge of the inner door panel 14 as shown in FIG. 2. The projections 90 resist a pull-off of the inner belt weather strip 72 during window elevating movement.

The inner belt weather strip 72 also includes means defining an upper inner channel 92 formed between the side leg 84 and an inner leg 94. The channel 92 is configured for receiving the first or upper end 22 of the inner door trim panel 20. Various attachment mechanisms, such as push pins, adhesive, adhesive tape, etc., may be employed to fixedly secure the first end or flange 22 on the inner door trim panel 20 in the channel 92 in the inner belt weather strip 72.

An inner lower flange 96 depends from the upper flange 94 and is spaced from a lower portion of the side wall 84 to form a channel for receiving one end of the shield 74. The same attachment mechanisms described above for attaching the shield 42 to the inner belt weather strip 30, as shown in FIG. 1, may also be employed to attach one end of the shield 74 to the inner belt weather strip 72, such mechanisms including a snap-fit, adhesives, fasteners, etc.

The lower or opposed edge of the shield 74 is fixedly secured to the lower door seal 76 in the same manner as described above and shown in FIG. 1.

Alternately, the inner belt weatherstrip 72, the shield 74 and the lower door seal 76 may be co-extruded or joined together by heat or sonic-bonding at the adjoining edges into a unitary structure, with the weatherstrip 72, the shield 74 and the lower door seal 76 then forming portions of the integrated unitary module 70.

The door protector module 70 shown in FIG. 2, functions in the same manner as the shield module 28 shown in FIG. 1 in that the inner belt weather strip 72, the shield 74 and the lower door seal 76 are unitarily joined in a one piece assembly for easy attachment to the inner door trim panel 20 and the inner door panel 14 sheet metal.

In conclusion, there has been disclosed a unique unitary door protector module which has an inner belt weatherstrip, a shield and a lower door seal integrated into a one piece, unitary assembly for mounting on one of the inner door trim panel or the door inner panel in a single assembly operation. This simplifies the vehicle door assembly process reduces manufacturing costs due to reduced labor, reduced worker time, and decreased assembly line length. In addition, the reliability of the components is increased since the module can be pretested for quality prior to installation on the vehicle.

What the claim is:

1. A door protector module for a vehicle door having an inner door panel and an inner door trim panel, the module comprising:

an inner belt weather strip, a shield, and a lower door seal; and means for joining the inner belt weather strip, the shield, and the lower door seal into a one piece module adapted for unitary attachment to one of the inner door trim panel and the inner door panel of a vehicle door.

2. The door protector module of claim 1 wherein:

the protector module is mounted on the inner door trim panel.

3. The door protector module of claim 2 further comprising:

means, carried on the belt weatherstrip and the inner door trim panel, for affixing the inner belt weatherstrip to the inner door trim panel.

4. The door protector module of claim 3 wherein the affixing means comprises:

an upper lip carried on the inner belt weatherstrip, the upper lip defining a snap connection to the inner door trim panel.

5. The door protector module of claim 3 wherein affixing means comprises:

a snap connection affixing means.

6. The door protector module of claim 3 wherein the affixing means comprises:

fastening means for fastening the inner door weatherstrip to the inner door trim panel.

7. The door protector module of claim 2 wherein the joining means further comprises:

means, carried on the inner door weatherstrip and the shield, for securing the inner belt door weatherstrip to the shield.

8. The door protector module of claim 7 wherein the securing comprises:

a snap connection means carried on the inner belt weatherstrip.

9. The door protector module of claim 8 wherein the snap connection comprises:

a channel carried on the inner belt weatherstrip, the shield mountable in the channel; and fastener means for securing the shield in the channel on the inner belt weatherstrip.

10. The door protector module of claim 9 wherein:

the fastener means is carried in the channel.

11. The door protector module of claim 1 wherein:

the door protector module is mounted on the inner door panel.

12. The door protector module of claim 11 further comprising:

means, carried on the inner belt weatherstrip for affixing the inner belt weatherstrip to the inner door panel.

13. The door protector module of claim 12 wherein the affixing means comprises:

a first channel carried on the inner belt weatherstrip for a snap connection to the inner door panel.

14. The door protector module of claim 13 further comprising;

fastener means, mounted in the first channel, for fixed engagement with the inner door panel.

15. The door protector module of claim 12 further comprising:

means for securing the inner belt weatherstrip to the shield.

16. The door protector module of claim 15 wherein the securing means comprises:

a second channel carried on the inner belt weatherstrip for receiving one edge of the shield therein; and fastening means for fastening the one end of the shield in the second channel of the inner belt weatherstrip.

17. The door protector module of claim 12 further comprising:

means for securing the shield to the lower door seal.

18. The door protector module of claim 17 wherein the securing means comprises:

a channel carried on the lower door seal, the channel receiving the edge of the shield; and fastener means for securing the shield in the channel in the lower door shield.

19. A method for manufacturing a door protector module for a vehicle door having an inner door panel and an inner door trim panel, the method comprising steps of:

providing an inner belt weatherstrip, a shield and a lower door seal; and unitarily joining the inner belt weatherstrip, the shield and a lower door seal into a unitary, one piece module for attachment to one of the inner door trim panel and the inner door panel.

20. The method of claim 19 wherein the step joining the inner belt weatherstrip, the shield and the lower door seal into a one piece module comprises the steps of:

forming complimentary surfaces in at least one of the inner belt weatherstrip, the shield and the lower door shield for receiving at least one of the inner belt weatherstrip, the shield and the lower door seal therein.

* * * * *